United States Patent
Li et al.

(10) Patent No.: US 8,344,541 B1
(45) Date of Patent: Jan. 1, 2013

(54) REVERSE CURRENT PROTECTION METHODS AND SYSTEMS FOR TRAILER TOW

(75) Inventors: Kang Li, Windsor (CA); Alain Grenier, Ann Arbor, MI (US)

(73) Assignee: Yazaki North America, Inc., Canton, MI (US)

(*) Notice: Subject to any disclaimer, the term of this patent is extended or adjusted under 35 U.S.C. 154(b) by 1295 days.

(21) Appl. No.: 11/686,060

(22) Filed: Mar. 14, 2007

(51) Int. Cl.
*B60L 1/00* (2006.01)
*H01H 47/00* (2006.01)

(52) U.S. Cl. ...................... 307/10.1; 307/127

(58) Field of Classification Search ............. 307/127, 307/10.1
See application file for complete search history.

(56) References Cited

U.S. PATENT DOCUMENTS

| | | | |
|---|---|---|---|
| 3,090,871 A | 5/1963 | Gorman | |
| 3,704,629 A | 12/1972 | Skarivoda | |
| 4,010,410 A | 3/1977 | Kilbourn | |
| 4,055,708 A | 10/1977 | Yamamoto | |
| 4,132,942 A | 1/1979 | Yamamoto | |
| 4,743,830 A | 5/1988 | Lakey | |
| 5,289,103 A | 2/1994 | Eccleston | |
| 5,726,553 A | 3/1998 | Waugh | |
| 5,936,317 A * | 8/1999 | Sasanouchi et al. ......... 307/10.7 |
| 5,977,652 A | 11/1999 | Frey et al. | |
| 5,977,744 A | 11/1999 | Williams et al. | |
| 6,057,666 A | 5/2000 | Dougherty et al. | |
| 6,166,516 A | 12/2000 | Albright et al. | |
| 6,275,001 B1 | 8/2001 | Dierker | |
| 6,426,606 B1 | 7/2002 | Purkey | |
| 6,452,361 B2 | 9/2002 | Dougherty et al. | |
| 6,577,105 B1 | 6/2003 | Iwaizono | |
| 6,710,575 B2 | 3/2004 | Youn | |
| 6,717,291 B2 | 4/2004 | Purkey | |
| 6,734,651 B2 | 5/2004 | Cook et al. | |
| 6,922,322 B2 * | 7/2005 | Strayer et al. .................. 361/111 |
| 6,967,463 B1 * | 11/2005 | Gordon et al. ................. 320/103 |
| 7,126,801 B2 * | 10/2006 | Jokinen ........................... 361/85 |
| 2002/0125771 A1 * | 9/2002 | Kaminski ..................... 307/10.1 |
| 2004/0164705 A1 | 8/2004 | Taniguchi | |
| 2004/0222703 A1 * | 11/2004 | Bienvenu et al. ............. 307/138 |
| 2004/0251870 A1 | 12/2004 | Ueda | |
| 2005/0077866 A1 | 4/2005 | Killian et al. | |
| 2006/0085099 A1 * | 4/2006 | Burlak et al. ...................... 701/1 |

* cited by examiner

*Primary Examiner* — Michael Rutland Wallis
(74) *Attorney, Agent, or Firm* — Harness, Dickey & Pierce, P.L.C.

(57) ABSTRACT

A reverse current protection system for a vehicle electrical system that communicates with a trailer electrical system generally includes a mode determination module that receives a reverse current flow detection signal and that selectively determines a field effect transistor (FET) operating mode to be a reverse on mode based on the reverse current flow detection signal. A current flow control module generates a current flow control signal to a field effect transistor to control the field effect transistor based on the determined FET operating mode.

11 Claims, 5 Drawing Sheets

REVERSE CURRENT PROTECTION METHODS AND SYSTEMS FOR TRAILER TOW

FIELD

The present teachings relate to methods and systems for controlling the reverse flow of current from a first power source to a second power source and more particularity relate to reverse current protection for a vehicle electrical system electrically connected to a trailer battery.

BACKGROUND

It is common for an owner of a vehicle, such as an automobile, truck or the like, to tow or trail various trailers, such as a camper trailer, a boat trailer, a storage trailer, or the like. Electrical power is made available to the trailer by an electrical connector that electrically connects the towing vehicle's electrical supply system to a trailer electrical system. Vehicle electrical connectors can be configured to connect between the various trailers and the vehicle. For example, the Society of Automotive Engineers (SAE) has promulgated a standardized connection scheme that allows for intermixed connection between various types of vehicles and trailers.

In some vehicles, a standardized connection scheme includes an output for providing current to an auxiliary power source such as a battery of the trailer. When the trailer is connected to the vehicle, a vehicle battery charges the trailer battery via the output of the electrical connector. When charged, the trailer battery supplies power to various electrical loads of the trailer.

In some cases, current can flow from the trailer back to the vehicle when the voltage of the trailer battery is higher than the voltage of the vehicle battery. Such is typically the case during a vehicle cranking event. When the trailer battery is fully charged, the reverse current flow can be excessive and can cause damage to electronic switching components of the electrical connection. To prevent this damage, an additional switch, such as a relay contactor or a second field effect transistor (FET) can be used to block the reverse current flowing to the vehicle. For example, one switch is controlled to allow current to flow from the vehicle to the trailer and the other is controlled to block current flowing from the trailer to the vehicle. However, implementing two switches may introduce additional costs as well as complexity to the vehicle electrical connection system.

SUMMARY

The present teachings generally include a reverse current protection system for a vehicle electrical system that communicates with a trailer electrical system. The reverse current protection system generally includes a mode determination module that receives a reverse current flow detection signal and that selectively determines a field effect transistor (FET) operating mode to be a reverse on mode based on the reverse current flow detection signal. A current flow control module generates a current flow control signal to a field effect transistor to control the field effect transistor based on the determined FET operating mode.

Further areas of applicability will become apparent from the description provided herein. It should be understood that the description and specific examples are intended for purposes of illustration only and are not intended to limit the scope of the present teachings.

BRIEF DESCRIPTION OF THE DRAWINGS

The drawings described herein are for illustration purposes only and are not intended to limit the scope of the present teachings in any way.

DETAILED DESCRIPTION

Figure 1:
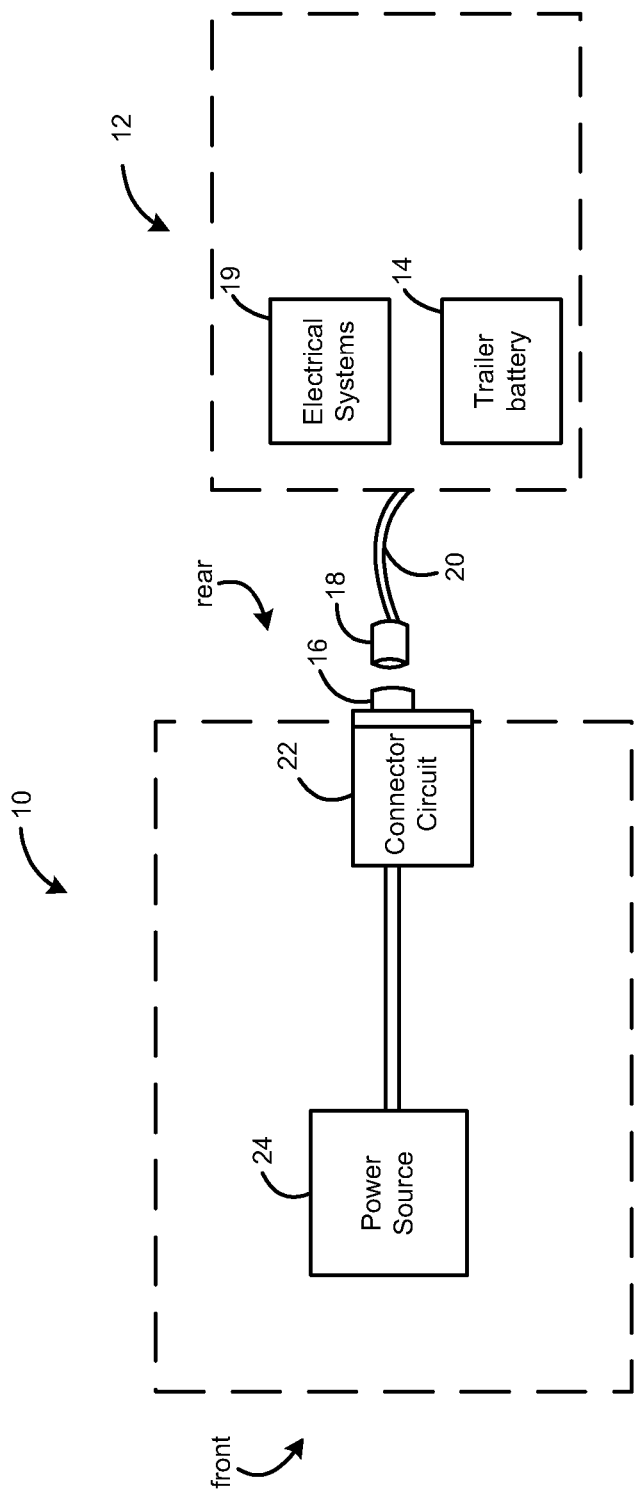
FIG. 1 is a block diagram illustrating a vehicle including a reverse current protection system in accordance with various aspects of the present teachings.

The following description is merely exemplary in nature and is not intended to limit the present teachings, their application, or uses. It should be understood that throughout the drawings, corresponding reference numerals indicate like or corresponding parts and features. As used herein, the term module, control module, component and/or device can refer to one or more of the following: an application specific integrated circuit (ASIC), an electronic circuit, a processor (shared, dedicated or group) and memory that executes one or more software or firmware programs, a combinational logic circuit and/or other suitable mechanical, electrical or electromechanical components that can provide the described functionality and/or combinations thereof.

With reference to FIG. 1 and in one aspect of the present teachings, a vehicle shown generally at 10 can include a reverse current protection system for an electrical connection device that can charge a trailer battery 14. It can be appreciated in light of the disclosure that the reverse current protection system can be applicable to various electrical connection devices. For example, a similar electrical connection device can be used for tractors and trailers and between multiple trailers. For exemplary purposes, various aspects of the reverse current protection system will be discussed in the context of the vehicle 10 and a trailer 12 that can include a battery 14.

As shown in FIG. 1, the vehicle 10 can include at least one vehicle electrical connector 16 that can couple to or be near a rear end of the vehicle 10. The vehicle electrical connector 16 can include a plurality of output pins that can mate with a plurality of receptacles, or electrical terminals of a trailer electrical connector 18. In various aspects, the trailer electrical connector 18 can be connected and disconnected to the vehicle electrical connector 16. When connected to the vehicle electrical connector 16, the trailer electrical connector 18 can provide current to various electrical systems 19 and the battery 14 of the trailer via a wiring harness 20. Such electrical systems 19 can include, but are not limited to, tail light systems, turn signal systems, and a braking system.

As will be discussed further, the reverse protection system can include a connector circuit 22 that can control the flow of current from a power source 24 of the vehicle 10 to the trailer battery 14 via the electrical connectors 16 and 18. The connector circuit 22 can control the flow of current at a sufficient rate to charge the trailer battery 14. Additionally, the connector circuit 22 can protect itself in case of the reverse flow of current from the trailer battery 14 to the power source 24 in the event that the voltage of the trailer battery 14 is greater than the voltage of the power source 24.

Figure 2A:
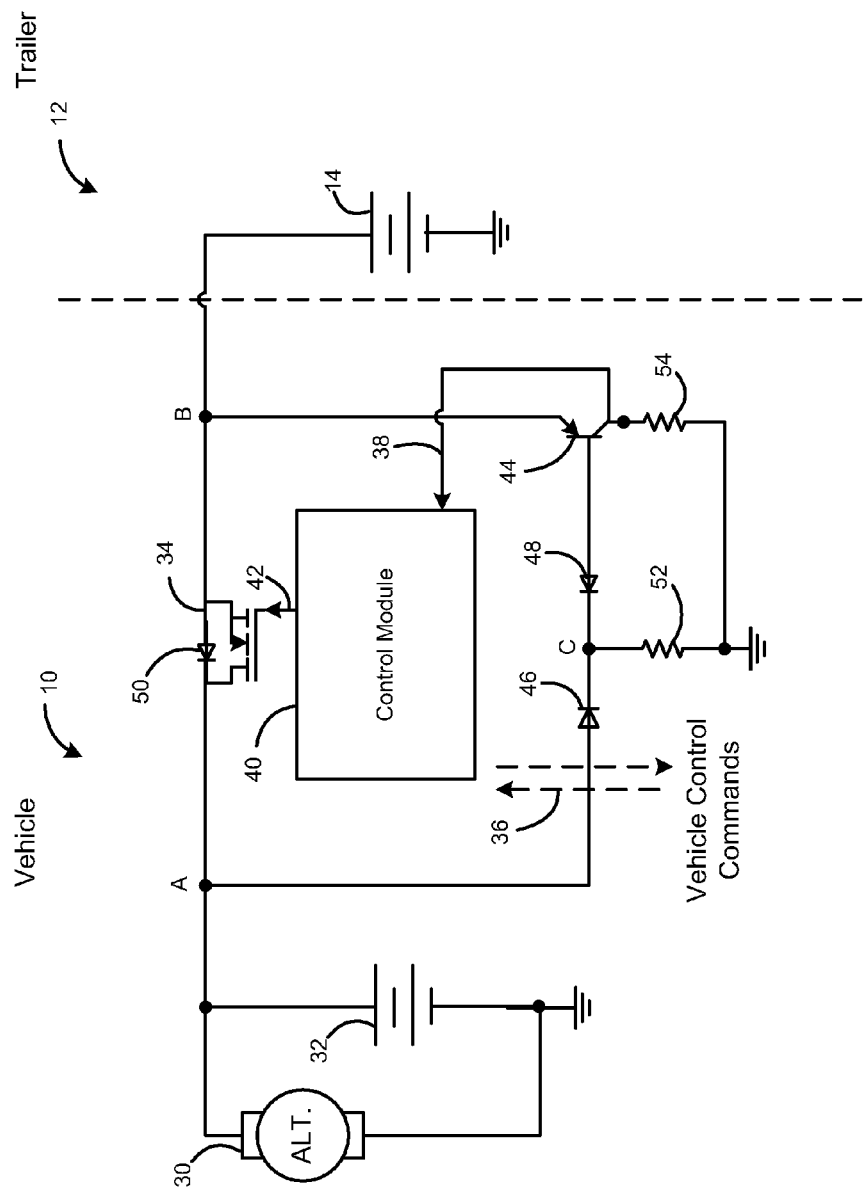
FIG. 2A is a diagram illustrating an exemplary electrical schematic of a reverse current protection system implemented in a vehicle in accordance with various aspects of the present teachings.
Figure 2B:
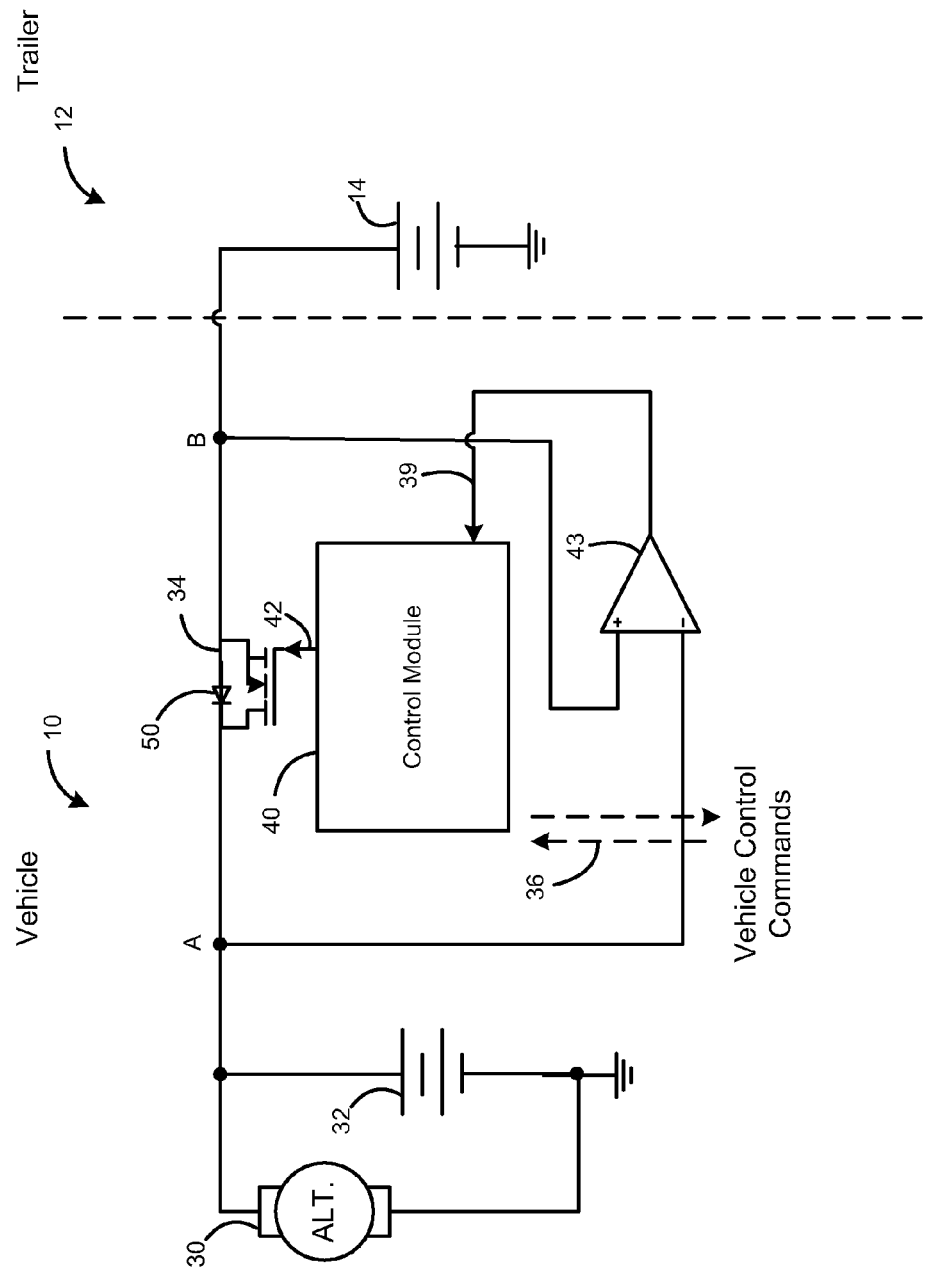
FIG. 2B is a diagram illustrating another exemplary electrical schematic of a reverse current protection system implemented in a vehicle in accordance with various aspects of the present teachings.

With reference to FIGS. 2A and 2B, diagrams of electrical schematics illustrate exemplary reverse current protection systems implemented in the vehicle 10 in accordance with various aspects of the present teachings. As shown, a vehicle alternator 30 can charge the trailer battery 14 while the vehicle engine (not shown) is in operation. A switch 34 such as a metal-oxide-semiconductor field-effect transistor (MOSFET, simplified as FET hereafter) is controlled to allow current from the alternator 30 to flow to the trailer battery 14. Based on vehicle control commands 36 received from other control modules (not shown) within the vehicle 10 and a reverse current detection signal 38 or 39, a control module 40 controls the state of the FET 34 via a FET control signal 42. In general, when reverse current is detected while the FET 34 is OFF, the control module 40 controls the FET 34 to be turned ON to prevent damage to the FET 34.

In various aspects, as shown in FIG. 2A, the reverse current protection system can include a transistor 44, a first forward diode 46, a second forward diode 48, a body diode 50 of the FET 34, and a resistor 52. As will be discussed further, the transistor 44 automatically generates a reverse current detection signal 38 based on a reverse current flow from the trailer battery 14 to the vehicle battery 32. In various other aspects, as shown in FIG. 2B, the reverse current protection system can include a comparator 43 that compares the voltage drop across the FET 34 due to the reverse current flow from the trailer battery 14 to the vehicle battery 32. As will be discussed further, the comparator 43 generates a reverse current detection signal 39 based on the comparison.

Figure 3:
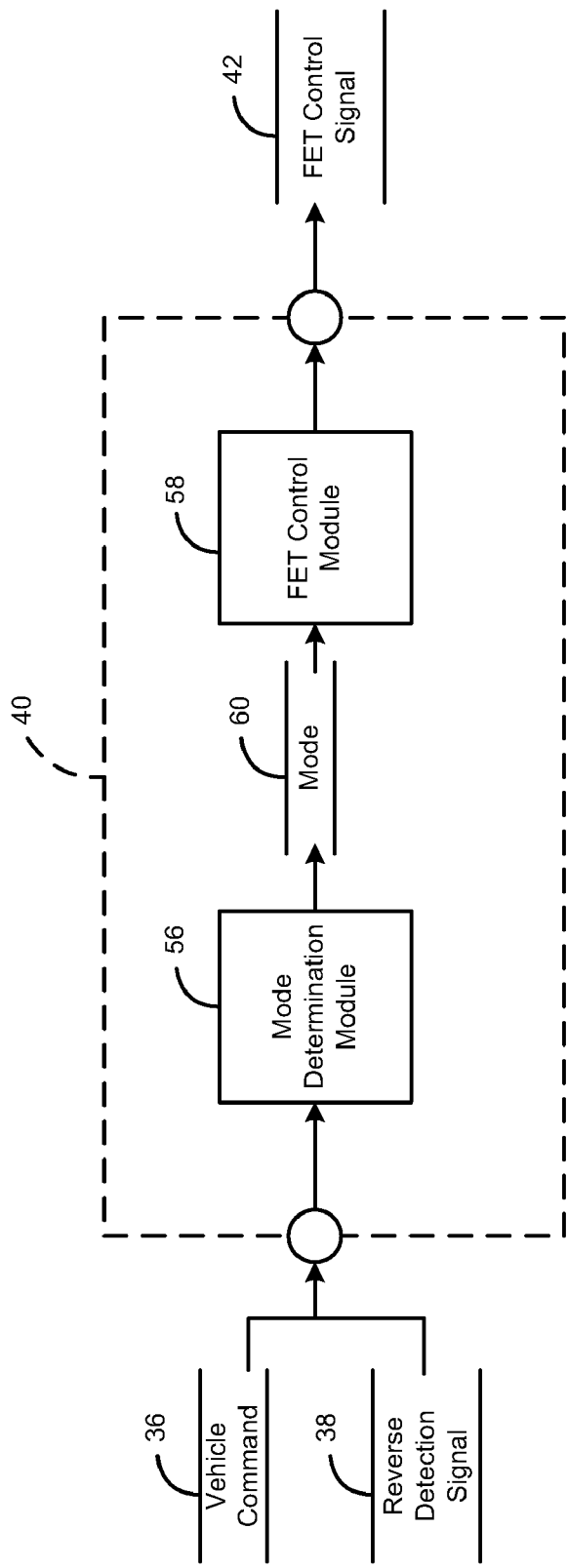
FIG. 3 is a data flow diagram illustrating an example of a reverse current protection control system implemented in a control module of the vehicle in accordance with various aspects of the present teachings.

With reference to FIG. 3 and continued reference to FIG. 2A, a data flow diagram illustrates a reverse current protection system that can be implemented within the control module 40 in accordance with various aspects of the present teachings. It will be appreciated in light of the disclosure that various aspects of reverse current protection systems in accordance with the present teachings can include any number of sub-modules embedded within the control module 40. The sub-modules can be combined and/or further partitioned to similarly control the flow of current to and from the trailer battery 14. Inputs to the system can be sensed from the vehicle 10, received from other control modules (not shown) within the vehicle 10, and/or determined by other sub-modules (not shown) within the control module 40. In various aspects of the present teachings, the control module 40 of FIG. 3 can include a mode determination module 56 and a FET control module 58.

The mode determination module 56 can receive as input the vehicle command 36 and/or the reverse current detection signal 38. Based on the inputs 36 and 38, the mode determination module 56 can determine an operating mode 60 to be at least one of an "off" mode, a "normal on" mode, and a "reverse on" mode. More particularly, the mode determination module 56 can determine the operating mode to be the "off" mode when the vehicle command 36 indicates to turn OFF the FET 34. The mode determination module 56 can determine the operating mode to be the "normal on" mode when the vehicle command 36 indicates to turn ON the FET 34. The mode determination module 56 can determine the operating mode to be the "reverse on" mode when the reverse current detection signal 38 indicates reverse flow is detected.

The FET control module 58 can receive as input the operating mode 60. Based on the operating mode 60, the FET control module 58 can generate the FET control signal 42 to the FET 34. For example, if the operating mode indicates the "normal on" mode or the "reverse on" mode, the FET control signal 42 can be commanded such that the FET is turned ON. If the operating mode indicates the "off" mode, the FET control signal 42 can be commanded such that the FET is turned OFF.

Figure 4:
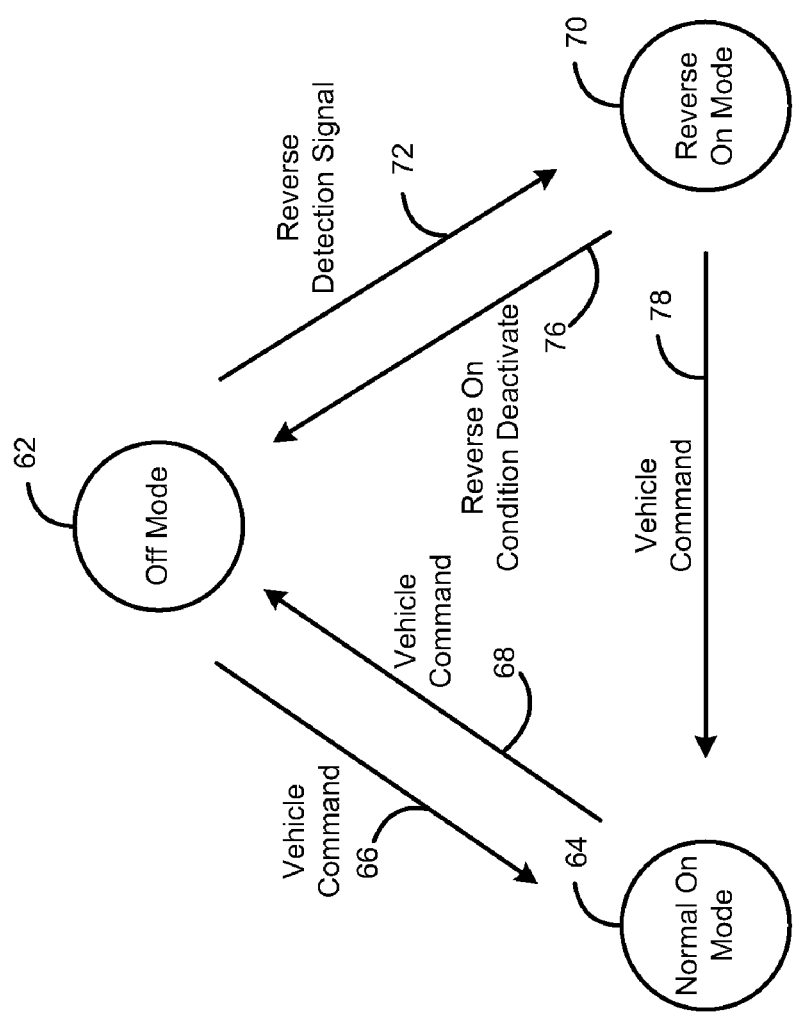
FIG. 4 is a state flow diagram illustrating state transitions that can be implemented in the control module of the reverse current protection system in accordance with various aspects of the present teachings.

With reference to FIG. 4 and continued reference to FIG. 2A, a state flow diagram illustrating a reverse current protection state machine that can be implemented in the control module 40 of the reverse current protection system in accordance with various aspects of the present teachings is shown. The state machine can include at least three states. Each state can represent one of the particular operating modes 60 (FIG. 3), for example, the "off" mode, the "normal on" mode, and the "reverse on" mode. While operating in each state, the reverse current protection system can perform certain functions. Transitions between each state are governed by transition conditions.

In one example, the state can transition from an "off" mode 62 to a "normal on" mode 64 at transition 66 when the vehicle command 36 indicates to turn ON the FET 34. While in the "normal on" mode 64, the FET control module 58 (FIG. 3) can turn ON the FET 34 via the FET control signal 42. Thus, the voltage at point A ($V_A$) (FIG. 2A) can be about equal to the voltage at point B ($V_B$), i.e. $V_A=V_B$ (ignoring the voltage drop across the turned on FET 34). The voltage at point C ($V_C$) can be about equal to the voltage at point A ($V_A$) minus the voltage drop across the first forward diode 46 ($V_{FD}$), i.e. $V_C=V_A-V_{FD}$. In order for the transistor 44 to be turned on, the voltage at point B ($V_B$) ought to be greater than the voltage at point C ($V_C$) plus two voltage drops across the forward diode 46 and the emitter-base diode of the transistor 44 (i.e., $V_B>V_C+2*V_{FD}=V_A-V_{FD}+2*V_{FD}=V_A+V_{FD}$, hence $V_B>V_A+V_{FD}$). Thus, the transistor 44 can remain OFF and the reverse current detection signal 38 can be a logical low state indicating no reverse flow detection.

While in the "normal on" mode 64, the state can transition from the "normal on" mode 64 back to the "off" mode 62 at transition 68 when the vehicle command 36 indicates to turn OFF the FET 34. While in the "off" mode 62, the FET control module 58 (FIG. 3) can turn OFF the FET 34 via the FET control signal 42. In a normal situation, the voltage at the alternator 30 or the vehicle battery 32 can be about equal to or greater than that of the trailer battery 14. Thus, the voltage at point A ($V_A$) can be greater than the voltage at point B ($V_B$) (i.e., $V_A>V_B$). As described with regard to the "normal on" mode, that the condition cannot meet the criteria ($V_B>V_A+V_{FD}$) for which the transistor 44 can be turned ON. Thus, the transistor 44 can remain OFF and the reverse current detection signal 38 can be a logical low state indicating no reverse flow detection.

In another example, the state can transition from the "off" mode 62 to the "reverse on" mode 70 at transition 72 when the reverse current detection signal 38 changes to a logical high state indicating that reverse flow is detected. The reverse current detection signal 38 can indicate the logical high state when the transistor 44 is turned ON. In particular, when a current flows from the trailer battery 14 to the vehicle battery 32 while the FET 34 is OFF (reverse flow), the reverse current flow through the body diode 50 of the FET 34 can create a voltage drop. When the reverse current is beyond a certain value, the voltage drop can be greater than the forward voltage drop across the emitter-base diode of the transistor 44. Thus, as discussed above, the voltage at point B ($V_B$) becomes greater than the voltage at point A ($V_A$) plus about one voltage drop of a forward diode ($V_{FD}$) (i.e., $V_B > V_A + V_{FD}$), the transistor 44 can be automatically turned ON causing a logical high state at the reverse detection signal 38 to indicate a "reverse on" mode. While in the "reverse on" mode 70, the FET control module 58 (FIG. 3) can turn ON the FET 34 via the FET control signal 42. Thus, the voltage at point A ($V_A$) can be about equal to the voltage at point B ($V_B$) (ignoring the voltage drop across the turned on FET 34).

In order for the transistor 44 to remain ON, as discussed above, the voltage at point B ($V_B$) should be greater than the voltage at point A ($V_A$) plus a voltage drop at the first forward diode ($V_{FD}$) (i.e., $V_B > V_A + V_{FD}$). If this condition is not satisfied in the "reverse on" mode 70, the transistor 44 can be turned OFF. The reverse current detection signal 38 can change back to the logical low state indicating that no reverse flow is detected and the state can transition from the "reverse on" mode 70 to the "off" mode 62 at transition 76.

In various other aspects of the present teachings, the control module 40 can be programmed such that the transition of the reverse current detection signal 38 from the logical high signal to the logical low signal is ignored. The state can remain in the "reverse on" mode 70 for a predetermined time period (e.g., one second). During the time period, the state can transition to the "normal on" mode 64 at transition 78 when a vehicle command 36 is received indicating to maintain the FET 34 ON. Otherwise, the state can transition to the "off" mode 62 at transition 76 when the time period has expired and there is no vehicle command 36 indicating to maintain the FET 34 ON.

After transitioning to the "off" mode 62, if the reverse current still remains, the transistor 44 ON criteria, $V_B > V_A + V_{FD}$, can be satisfied again. Then the transistor 44 can turn on causing a logical high state at the reverse detection signal 38 to indicate a "reverse on" mode. Thus, the above discussed process can repeat. The recurrence of the transition between "off" mode 62 and "reverse on" mode 70 can repeat back and forth until the reverse current stops.

With reference to FIG. 4 and continued reference to FIG. 2B, in yet another aspect, the state can transition from the "off" mode 62 to the "reverse on" mode 70 at transition 72 when the reverse current detection signal 39 changes to a logical high state indicating that reverse flow is detected. The reverse current detection signal 39 can indicate the logical high state when current flows from the trailer battery 14 to the vehicle battery 32 through the body diode 50, causing a voltage at point B ($V_B$) higher than a voltage at point A ($V_A$) (i.e., $V_B > V_A$). As the condition ($V_B > V_A$) is met, the voltage comparator 43 outputs a logical high state at the reverse detection signal 39 to indicate a "reverse on" mode. While in the "reverse on" mode 70, the FET control module 58 (FIG. 3) can turn ON the FET 34 via the FET control signal 42. As long as the reverse current flow is maintained, the condition $V_B > V_A$ can be satisfied no matter if the FET 34 is ON or OFF. The "reverse on" mode can remain unchanged until the reverse current stops. Thus, the FET 34 can remain in the "reverse on" mode 70 or transfer to the "normal on" mode 64 at transition 74 when a vehicle command 36 is received indicating to maintain the FET 34 ON.

While specific aspects have been described in this specification and illustrated in the drawings, it will be understood by those skilled in the art that various changes can be made and equivalents can be substituted for elements thereof without departing from the scope of the present teachings, as defined in the claims. Furthermore, the mixing and matching of features, elements and/or functions between various aspects of the present teachings is expressly contemplated herein so that one skilled in the art will appreciate from the present teachings that features, elements and/or functions of one aspect of the present teachings can be incorporated into another aspect, as appropriate, unless described otherwise above. Moreover, many modifications can be made to adapt a particular situation, configuration or material to the present teachings without departing from the essential scope thereof. Therefore, it is intended that the present teachings not be limited to the particular aspects illustrated by the drawings and described in the specification as the best mode presently contemplated for carrying out the present teachings but that the scope of the present teachings will include many aspects and examples following within the foregoing description and the appended claims.

What is claimed is:

1. A reverse current protection system for a vehicle in electrical communication with a trailer, comprising:
    a first voltage source of the vehicle;
    a second voltage source of the trailer that is charged by said first voltage source;
    a field effect transistor electrically disposed between said first voltage source and said second voltage source and that is controlled to allow current to flow one of to and from said second voltage source;
    a reverse flow detection module that generates a reverse detection signal based on a detection of a flow of current from said second voltage source to said first voltage source; and
    a control module that receives said reverse detection signal and that controls said field effect transistor to turn on when said reverse flow is detected.

2. The system of claim 1 wherein said reverse flow detection module automatically generates said reverse detection signal when a current flows from said second voltage source to said first voltage source.

3. The system of claim 1 wherein said control module receives a vehicle command and selectively controls said field effect transistor based on said vehicle command.

4. The system of claim 3 wherein said control module selectively controls said field effect transistor to be on when said vehicle command requests that said field effect transistor be turned on.

5. The system of claim 3 wherein said control module selectively controls said field effect transistor to be off when said vehicle command requests that said field effect transistor be turned off.

6. The system of claim 1 wherein said control module selectively controls said field effect transistor to remain in a reverse on mode until a reverse on condition becomes invalid.

7. The system of claim 1 wherein said reverse on condition is at least one of a predetermined time duration and an existence of current flow from said second voltage source to said first voltage source.

8. A reverse current protection system for a vehicle electrical system that communicates with a trailer electrical system, the reverse current protection system comprising:
    a reverse current detection module that generates a reverse current flow detection signal upon detecting a reverse current flow between the vehicle electrical system and the trailer electrical system;
    a mode determination module that selectively determines a field effect transistor (FET) operating mode to be a reverse on mode upon receiving the reverse current flow detection signal;

a FET control module that generates a current flow control signal based on the reverse on mode; and a FET that turns ON upon receipt of the current flow control signal.

9. The system of claim 8, wherein the reverse current detection module comprises a transistor.

10. The system of claim 9, wherein the transistor includes a base operably connected to the vehicle electrical system, an emitter operably connected to the trailer electrical system, and a collector operably connected to the mode determination module and FET control module.

11. The system of claim 8, wherein the reverse current detection module comprises a comparator with a first input operably connected to the vehicle electrical system and a second input operably connected to the trailer electrical system.

* * * * *